April 2, 1957     H. M. GEYER     2,787,749
MOTOR SPEED CONTROL SYSTEM
Filed Dec. 9, 1953     3 Sheets-Sheet 1

INVENTOR.
HOWARD M. GEYER
BY
Craig V. Morton
HIS ATTORNEY

April 2, 1957  H. M. GEYER  2,787,749
MOTOR SPEED CONTROL SYSTEM
Filed Dec. 9, 1953  3 Sheets-Sheet 2

INVENTOR.
HOWARD M. GEYER
BY Craig V. Morrow
HIS ATTORNEY

United States Patent Office 2,787,749
Patented Apr. 2, 1957

2,787,749

MOTOR SPEED CONTROL SYSTEM

Howard M. Geyer, Dayton, Ohio, assignor to General Motors Corporation, Detroit, Mich., a corporation of Delaware Application December 9, 1953, Serial No. 397,215

6 Claims. (Cl. 318—257)

This invention pertains to means for energizing an electro-motive device, and more particularly to a control system for energizing a reversible electric motor.

Heretofore, considerable difficulty has been encountered with the use of electric motor driven actuators, of either the electro-mechanical type as shown in my Patent No. 2,642,752, issued June 23, 1953, or the dual drive type as shown in my Patent No. 2,620,683, issued December 9, 1952. In electric motor driven actuators of the rotary or linear type, minute movements cannot, at present, be controlled with the desired accuracy. This invention relates to means for pulse cycling a reversible electric motor so as to intermittently energize the electric motor for rotation in either direction, and alter the time duration of the intermittent pulses so as to effect proportionalized control of the electric motor and/or actuator driven thereby. Accordingly, among my objects are the provision of means for proportionally energizing an electric motor; the further provision of means for effecting variable pulse cycle energization of a reversible electric motor; and the still further provision of means for effecting actuator movement at a rate proportional to the displacement of a manual control member.

The aforementioned and other objects are accomplished in the present invention by providing pulsing means and control means therefor so as to effect proportional energization of an electric motor. Specifically, the control system disclosed herein is adapted for energizing an electric motor driven actuator having a rotatable element. The rotatable element threadedly engages a non-rotatable, but lineally movable member through the agency of a plurality of circulating balls. The non-rotatable member, or nut, is operatively connected to a rod that is associated with a device to be positioned. The electric motor must necessarily be of the reversible type to function according to the teachings of this invention.

The motor energizing means comprises a source of electric current having one set of terminals connected to one end of the motor windings, the motor preferably being of the split series type. The other end of the motor windings is connected to a pair of spaced contacts which are carried by a reciprocal control rod. The rod-carried contacts cooperate with a pair of pivotally supported contacts that are alternately deflected towards the rod-carried contacts, at a constant frequency, so that pulse cycle energization of the electric motor comprising intermittent "off" and "on" operation thereof, may be effected by manual movement of the control rod.

The pivotally mounted contacts are engageable by rotary cams that alternately deflect the contacts toward the rod carried contacts. The rotary cams are driven through a gear reduction unit by a timing motor which establishes the frequency, or proportion, of "on" to "off" time of the pulsing unit. In operation, and when no actuator movement is desired, the control rod is moved to a neutral position, and thus the rod carried contacts are not engaged by the pivotally mounted contacts. Accordingly, no resultant motor energization or actuator movement will be effected. However, when actuator movement is desired, the control rod is displaced from its neutral position whereupon the character of each pulse cycle of motor energization is altered, i. e., the time duration of the clockwise, or counterclockwise, pulse is longer than the "off" time. Hence, the actuator will move in the desired direction at a rate proportional to the displacement of the input signal, or control rod.

With the system disclosed herein, the amount of actuator travel, be it linear or rotary, can be accurately controlled. Moreover, if the operator desires rapid actuator movement in either direction, the control rod need only be displaced a sufficient distance so that one pivotally mounted contact is maintained in engagement with its respective rod-carried contact, whereupon the electric motor wil be continuously energized to rotate in one direction.

Further objects and advantages of the present invention will be apparent from the following description, reference being had to the accompanying drawings wherein a preferred embodiment of the present invention is clearly shown.

Figure 1:
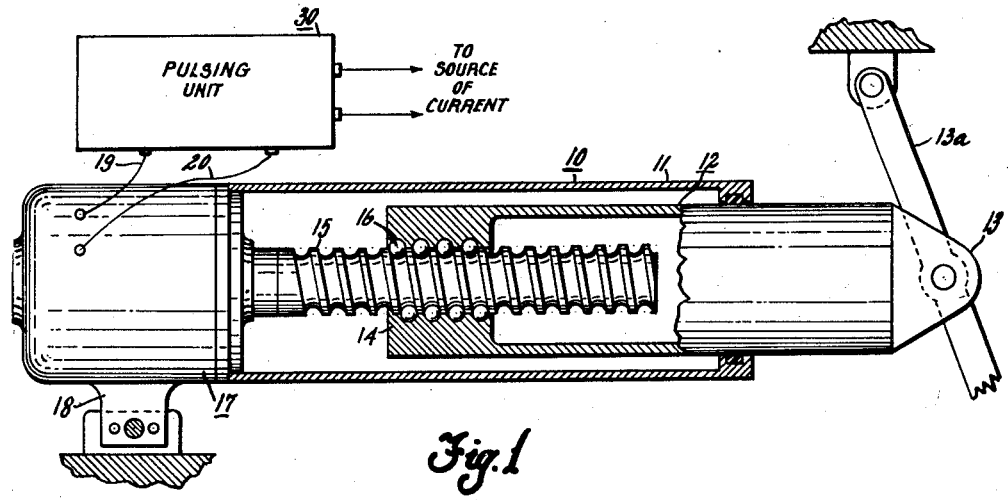
Fig. 1 is a view partly in section and partly in elevation of an electric motor driven linear actuator.

With particular reference to Fig. 1, an electric motor driven linear actuator 10 is depicted. The actuator comprises an outer tubular member 11 which telescopically receives a hollow rod 12, the free end of which carries a clevis 13 to which any suitable load device 13a is pivotally connected. The rod 12, as shown in Fig. 1, is formed integral with a non-rotatable member 14 having an internal spiral groove. The rod 12 is capable of linear movement relative to the tubular member 11, but is restrained against rotation relative thereto by reason of its connection with the load device 14. The non-rotatable member, or nut, 14 threadedly engages a rotatable element 15, having an exterior spiral groove, through the agency of a plurality of circulating balls 16. The balls circulate within the nut 14 upon rotation of the element or screw shaft 15, through passage means, not shown. The screw shaft 15 is connected to rotate with the shaft of a reversible electric motor 17. The electric motor 17 is preferably of the split-series, direct current type. The housing of the electric motor carries the tubular member 11, which housing is provided with a fixture 18 adapted for attachment to any suitable support. The split-series windings of the motor 17 are connected by wires 19 and 20 to a pulsing unit generally indicated by the numeral 30.

As the motor 17 is of the reversible, direct current type, the direction of motor rotation can be changed by reversing the current flow through the windings thereof. Moreover, although the pulsing unit of this invention is disclosed in conjunction with an electric motor driven linear actuator, it is to be understood that this is only by way of example and is not to be construed as a limitation.

Figure 2:
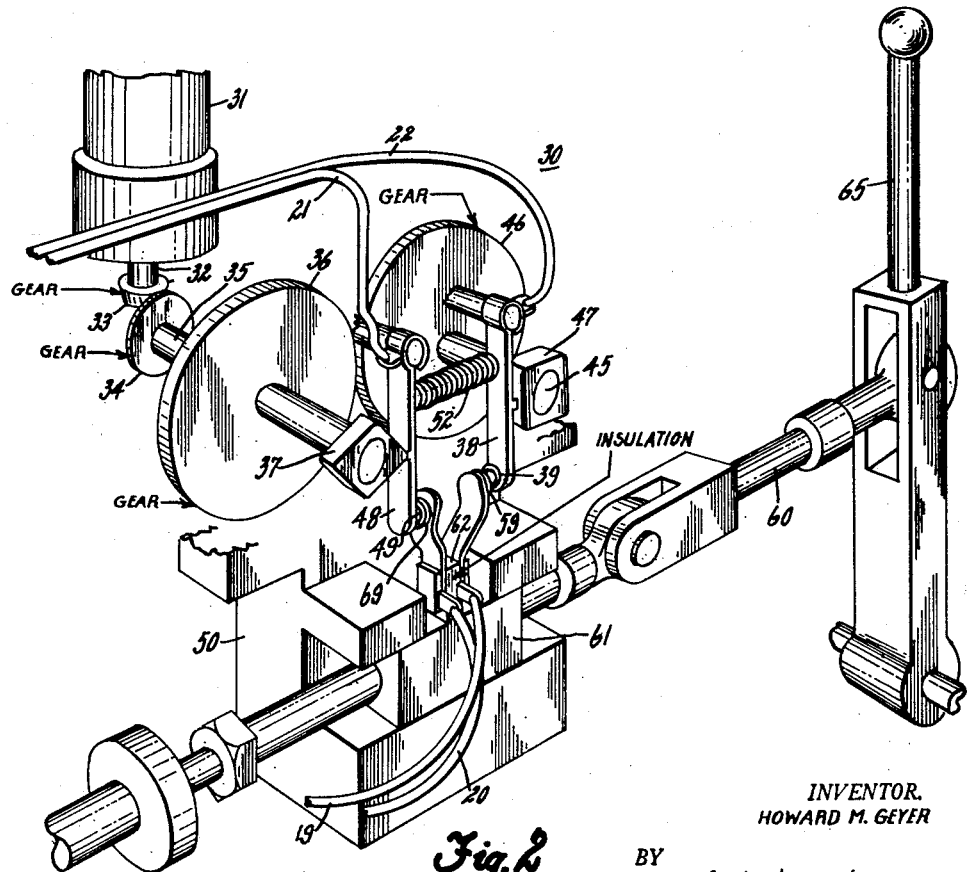
Fig. 2 is a fragmentary view in perspective of the pulsing unit.
Figure 3:
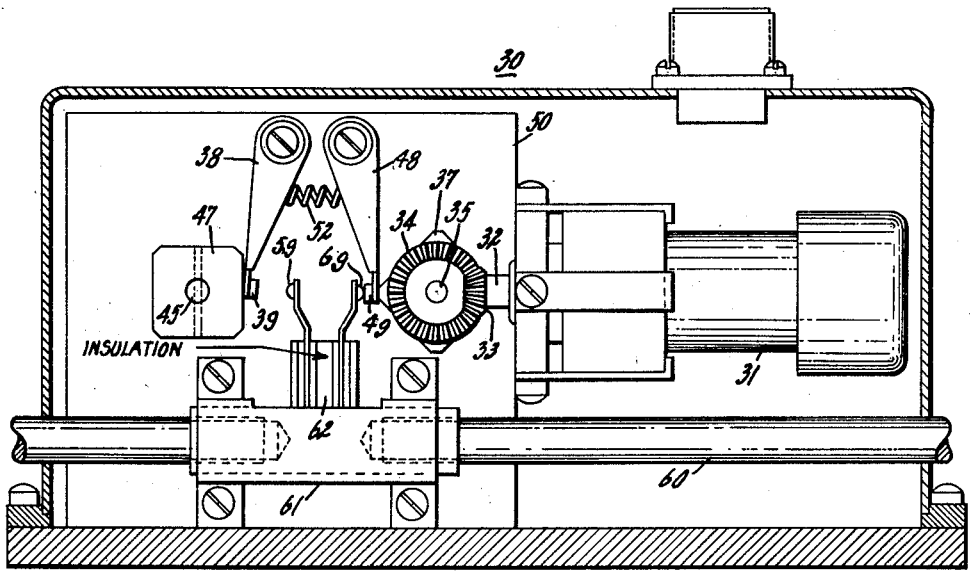
Fig. 3 is a side view in elevation of the pulsing unit.
Figure 4:
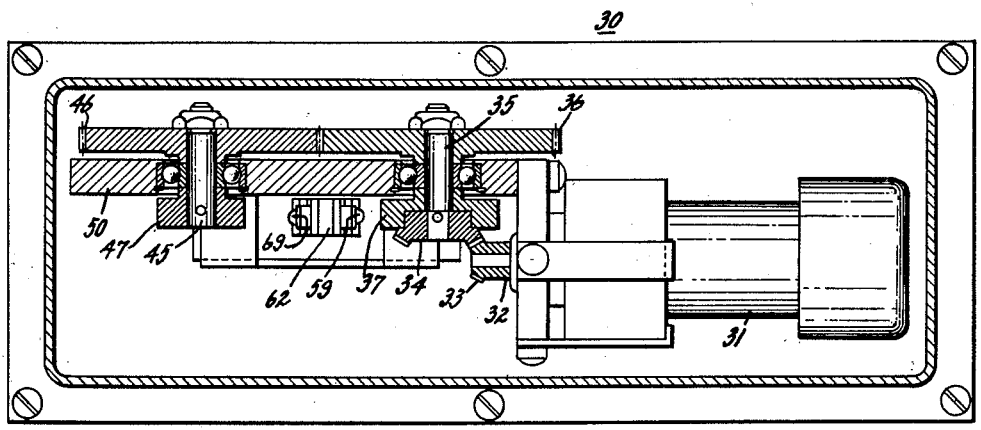
Fig. 4 is a top view, partly in section and partly in elevation of the pulsing unit.

With particular reference to Figures 2, 3, 4, the pulsing unit 30 will next be described. The pulsing unit includes a timing motor 31, the rotative speed of which is constant. The timing motor includes a shaft 32 having attached thereto a bevel gear 33 which meshes with a bevel gear 34 attached to shaft 35. The intermediate portion of the shaft 35 carries a spur gear 36 which meshes with a spur gear 46 carried by a shaft 45.

The shaft 35 also carries a four-lobe cam 37, while the shaft 45 carries a four-lobe cam 47. As is seen more particularly in Figures 3 and 4, the pulsing unit is disposed within a casing, the bottom wall of which carries a mounting plate 50. The mounting plate provides pivotal support for a pair of spaced contact arms 38 and 48, the contact arms being urged apart by a coiled compression spring 52. The contact arms 38 and 48 carry contacts 39 and 49, and the spring 52 maintains its respective arm in contact with cam either 37 or 47. Moreover, the cam lobes, or rises, of the cams 37 and 47 are displaced by 45° so that upon rotation of the spur gears 36 and 46, the contact arms 38 and 48 will be moved alternately about their pivotal supports.

The pulsing unit 30 also includes a manually reciprocal control rod 60 which is slidable in ways attached to the bottom wall of the pulsing unit housing. The control rod is attached to a block member 61 which carries a pad of insulating material 62 having attached thereto a pair of spaced contacts 59 and 69 adapted for engagement with contacts 39 and 49, respectively. Reciprocal movemtnt of the control rod may be effected by pivotal movement of a lever 65 so as to select the direction and speed of actuator movement.

The contacts 59 and 69 are connected by wires 19 and 20 to the motor windings, while contact arms 38 and 48 are connected by wires 21 and 22 to any suitable source of electric current. It should be noted that the control rod 60 is capable of substantial linear movement within the pulsing unit housing so that neither contacts 59 or 69 may be moved throughout a sufficient distance so that their respective engaging contacts 39 and 49 will not come into contact therewith. The purpose and function of this arrangement will be pointed out more particularly hereinafter.

Figure 6:
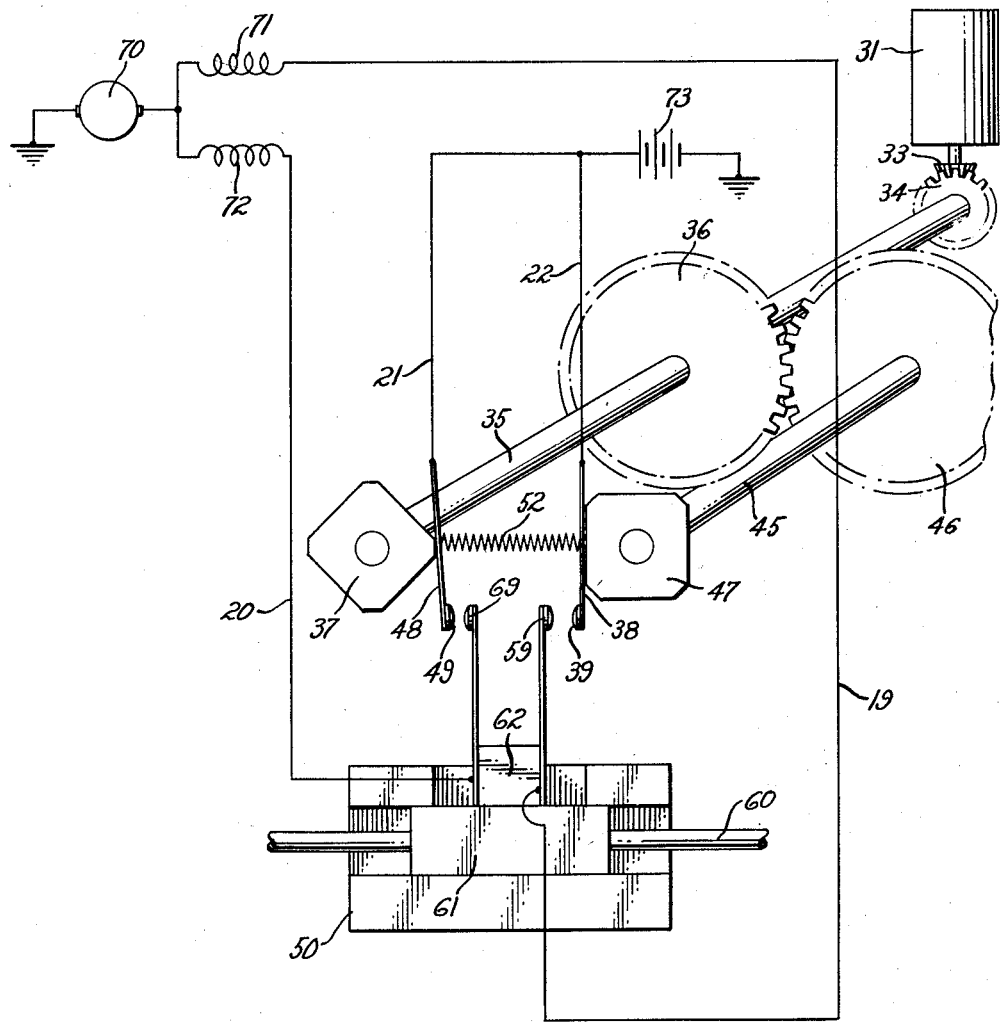
Fig. 6 is a schematic wiring diagram of the electric motor pulsing system.

With particular reference to Fig. 6, the reversible motor includes an armature 70, one terminal of which is connected to ground. The other terminal of the armature 70 is connected to the joined ends of a pair of directional field windings 71 and 72 of the motor. The other end of field winding 71 is connected by wire 19 to the rod carried contact 59, while the other end of field winding 72 is connected by wire 20 to the rod carried contact 69. Cam actuated contact 39 which is carried by arm 38 is connected by wire 22 to one terminal of a battery 73, the other terminal of the battery being connected to ground. Cam actuated contact 49 which is carried by arm 48, is connected by wire 21 to one terminal of the battery 73. When contact 49 engages contact 69, the field winding 72 and the armature 70 will be energized and the motor will rotate in one direction. When contact 39 engages contact 59, field winding 71 and armature 70 will be energized whereby the motor will rotate in the opposite direction.

*Operation*

In operation suitable switch means, not shown, are provided for connecting the wires 21 and 22 to the source of electric current. Thereafter, the operator need only position the lever 65 so as to effect the desired energization of the actuator and movement of the load device. If the control lever 65 is positioned so that the rod and block 61, and contacts 59 and 69 are equidistantly spaced from shafts 35 and 45, as depicted in Fig. 6, the motor will not be energized for rotation in either direction, and, accordingly, no resultant movement of the motor 17 will ensue. This follows, since when the contacts 59 and 69 are in the "neutral" position, an angular movement of 90° for each of the shafts 35 and 45 and their cams 37 and 47 will not result in a pulse cycle energization of the electric motor. Thus, the nut 14 which threadedly engages the screw shaft 15 will be maintained in the same position, and no movement will be transmitted to the load device 13a.

Figure 5:
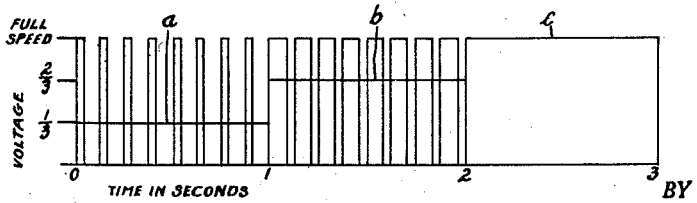
Fig. 5 is a graph depicting the proportional control of the electric motor as achieved by this invention.

Should the operator desire to extend the actuator 10, the control lever 65 will be moved in a clockwise direction, for example, whereupon the block 61 will be moved to the right as viewed in Figure 6, to the position of Figure 2. Accordingly, the contact 69 wil be moved throughout a predetermined distance towards the shaft 45 while the contact 59 will be moved throughout the same predetermined distance away from the shaft 35. Thus, during rotation of the shafts 35 and 45 and their cams 37 and 47, the contact 49 will be maintained in engagement with the contact 69 for period of time during each deflection of arm 48 by cam 37. Thus, the character of each pulse cycle of motor energization will depend upon the ratio of the on-off time of clockwise energization, so that the screw shaft 15 will experience a clockwise rotation so as to effect linear movement of the nut to the right, as viewed in Fig. 1, in accordance with the average motor speed. With reference to the graphs of Fig. 5, it should be noted that an infinite number of motor energization rates are possible. Thus, the motor may operate at approximately one-third, two-thirds, or full speed as depicted by lines *a, b* and *c*, respectively. The degree of motor energization is dependent only upon the ratio of "on" to "off" times, which, in turn, is dependent upon the displacement of control rod 60.

The converse is likewise true, that is, if the operator desires to effect actuator retraction, the lever 65 is moved in a counterclockwise direction so as to move the block to the left, as viewed in Fig. 6. In so doing, the contact 59 is moved towards the shaft 45. Thus, the character of the pulse cycle motor energization will be such that the motor will intermittently be energized for periods of time in the counterclockwise direction. Thus, the nut 14 and the rod 12 will be moved lineally to the left as viewed in Fig. 1 so as to position the load device 13a.

With the arrangement disclosed, the amount of actuator movement, and the position of the load device may be accurately controlled. Moreover, the control rod 60 may be positioned so as to effect continuous motor energization in either the clockwise or counterclockwise direction by positioning the block 61 so that either contact 59 or contact 69 will be moved into continuous engagement with its respective contact arm 38 or 48 during rotation of the timing motor 31. Thus when rapid actuator movement is desired, the pulse cycle of energization of the actuator electric motor is altered so that the motor is energized to rotate continuously in one direction. Moreover, an infinite number of time differential pulse cycles are possible with the arrangement disclosed inasmuch as the average speed of actuator movement is controlled by the operator and determined by the magnitude of linear movement imparted to the block 61 by the control rod 60.

From the foregoing, it is manifest that the present invention provides proportionalized control means for an electric motor. Moreover, while the control means disclosed herein is particularly adapted for actuating an electric motor driven actuator, it is to be understood that its field of use is not to be so limited.

While the embodiment of the present invention as herein disclosed constitutes a preferred form, it is to be understood that other forms might be adopted.

What is claimed is as follows:

1. Control means for the pulse cycle energization of a reversible electric motor having an armature and a pair of directional field windings including, a source of electric power, switch means in circuit connection between the source of power and the field windings, said switch means including a pair of pivotally mounted contacts and a pair of reciprocable contacts disposed therebetween, one pair of said contacts being connected to said source and the other pair of said contacts being connected to said directional field windings, and means for affecting relative movement between said pivotally mounted contacts and said reciprocable contacts to vary the character of the pulse cycle energization from intermittent pulses of varying time duration to continuous energization of the motor in either direction.

2. Control means for the pulse cycle energization of a reversible electric motor having an armature and a pair of directional field windings, including, a source of electric power, switch means in circuit connection between said source of power and said motor, said switch means including a pair of pivotally mounted contacts connected to said source and a pair of reciprocal contacts disposed therebetween and engageable therewith, each reciprocable contact being connected to one of said pair of directional field windings, cam means for imparting periodic and alternate pivotal movement to said pivotally mounted contacts, and means for reciprocating said reciprocable contacts to vary the character of said pulse cycle energization from intermittent pulses of variable time duration to effect motor movement in either direction to continuous energization of said motor to effect motor movement in either direction.

3. The combination set forth in claim 2 wherein the cam means for effecting pivotal movement of the pivotally mounted contacts are driven by a timing motor which establishes the frequency of the intermittent pulse cycle energization.

4. Control means for the pulse cycle energization of a reversible electric motor having an armature and a pair of directional field windings, including, a source of electric power, switch means in circuit connection between said source of power and said field windings, said switch means including a pair of pivotally mounted contacts and a pair of reciprocable contacts disposed therebetween, one pair of contacts being connected to said source and the other pair of contacts being connected to said pair of directional field windings, cam means for imparting periodic and alternate pivotal movement to said pivotally mounted contacts, and a reciprocable member to which said reciprocable contacts are attached for moving said reciprocable contacts in either direction whereby the degree of motor energization is proportional to the displacement of said member and the direction of motor movement is determined by the direction of movement of said member.

5. Control means for the pulse cycle energization of a reversible electric motor having an armature and a pair of directional field windings, including, a source of electric power, switch means in circuit connection between said source of power and said field windings, said switch means including a pair of pivotally mounted contacts and a pair of reciprocable contacts disposed therebetween, one pair of contacts being connected to said source and the other pair of contacts being connected to said pair of directional field windings, a pair of pivotally mounted arms, each arm carrying one of said pair of pivotally mounted contacts, a pair of cams engageable with said arms for imparting periodic and alternate pivotal movement to said arms and said pivotally mounted contacts, spring means disposed between said arms for urging said arms into engagement with their respective cams, and means for reciprocating said reciprocable contacts to vary the character of said pulse cycle energization from intermittent pulses of variable time duration to effect motor movement in either direction to continuous energization of said motor in either direction.

6. Control means of the character set forth in claim 5 wherein said last recited means comprises a reciprocable member to which said reciprocable contacts are attached whereby the degree of motor energization is proportional to the displacement of said member and the direction of motor movement is determined by the direction of movement of said member.

References Cited in the file of this patent

UNITED STATES PATENTS

| | | |
|---|---|---|
| 720,729 | McDonnell | Feb. 17, 1903 |
| 2,331,354 | Stout | Oct. 12, 1943 |
| 2,440,228 | Yardeny et al. | Apr. 20, 1948 |
| 2,502,967 | Leathers et al. | Apr. 4, 1950 |
| 2,520,492 | Colegrove | Aug. 29, 1950 |
| 2,530,749 | Yardeny et al. | Nov. 21, 1950 |
| 2,631,265 | Colegrove | Mar. 10, 1953 |
| 2,675,511 | Kutzler | Apr. 13, 1954 |